3,108,980
EMULSIFIABLE RUBBER EXTENDER OIL COMPOSITION AND METHOD OF EXTENDING RUBBER LATEX THEREWITH
Gilmore T. Gwin, Baytown, and Arthur R. Price, Houston, Tex., assignors, by mesne assignments, to Esso Research and Engineering Company, Elizabeth, N.J., a corporation of Delaware
No Drawing. Filed Mar. 10, 1960, Ser. No. 13,995
4 Claims. (Cl. 260—29.7)

This invention relates to an oil composition for use in the manufacture of oil extended rubber. More particularly, the present invention is directed to a method for incorporating the oil in aqueous rubber latices and to an extender composition to be utilized in practicing the method.

It is a conventional practice to incorporate oils, such as aromatic, naphthenic or paraffinic hydrocarbon oils into rubbery materials such as natural or synthetic rubber. This is conveniently accomplished by adding an aqueous oil emulsion to the rubber while the rubber is in the form of an aqueous latex. However, although the results have been generally satisfactory, there is much to be desired.

It has now been discovered that the oil may be directly incorporated into the rubber latex through the provision of an extender composition comprising from about 90 to 98 volume percent of an extender oil having a viscosity (SSU at 210° F.) within the range of about 40 to 200 and, correspondingly, from about 10 to 2 volume percent of an emulsifier composition for the extender oil consisting of a mixture of about 50 to 95 volume percent of an aliphatic hydrocarbon organic acid and about 50 to 5 volume percent of an alkylene oxide condensate of a fatty acid, said condensate containing from about 5 to 20 mols of alkylene oxide per mol equivalent of fatty acid. The components of the emulsifier composition for the extender oil should have a molecular weight within the range of about 200 to 2000. This emulisfier composition causes essentially spontaneous emulsification of the oil as it is mixed with the latex.

In accordance with the present invention, the emulsifier composition components are either premixed or separately added to the extender oil with agitation. Preferably, the mixing is accomplished at a temperature within the range of about 100° to about 200° F. The extender composition of the present invention is then added to an aqueous rubber latex with gentle agitation (preferably at a temperature within the range of about 100° to 200° F.) in an amount sufficient to provide from about 10 to 70 weight percent of oil based on the rubber. The agitation need not be as vigorous as is required in the preparation of aqueous oil emulsions by conventional methods. Rather, the agitation required here is merely that which is necessary to mix the extender oil into the latex.

The latex to be extended in accordance with the present invention is an aqueous emulsion of a natural or synthetic rubber. The aqueous emulsion will preferably contain from about 10 to 70 weight percent of rubber solids, the remainder being composed principally of water and containing minor amounts of emulsifier and, if desired, other constituents such as a carbon black, stabilizers, etc. It will be understood that any desired conventional emulsifying agent may be utilized in manufacturing the latex to be extended. Suitable emulsifiers are identified in the textbook entitled "Synthetic Rubber" by G. S. Whitby, published by John Wiley & Sons, N.Y.

A preferred latex is prepared by the emulsion polymerization of styrene and butadiene under conditions to procide a SBR type synthetic rubber of the 1100 series through the 1800 series, based upon the classification system adopted by Committee D–11 of the American Society for Testing Materials. Still more preferably, the styrene-butadiene synthetic rubber is a so-called "cold" rubber of the 1600 to 1800 series prepared, for example, by copolymerizing styrene and butadiene at a temperature of about 40° F. in an aqueous emulsion polymerization process employing a rosin acid soap or a fatty acid soap or a mixture thereof as the emulsifier, a suitable polymerization catalyst such as p-menthane hydroperoxide, a reaction initiator such as iron pyrophosphate, a modifier such as sulfole mercaptan, and a chain terminating agent or shortstop such as sodium dimethylidthiocarbamate. After polymerization, conventional additives such as carbon black, antioxidants, etc. may be added to the latex. Also, in accordance with the present invention, an oil extender composition of the present invention is added. After the mixing is complete, the rubber can be sprung from the latex by coagulation with any suitable coagulant such as sodium chloride and sulfuric acid.

It will be understood, of course, that other types of polymers may be utilized. Thus, for example, copolymers of monovinyl aromatic hydrocarbons such as styrene, alpha-methyl styrene, vinyl toluene, etc. with conjugated diolefins such as butadiene, isoprene, etc. may be used, nad also copolymers of conjugated dienes with vinyl cyanides such as acrylonitrile, alpha-meth-acrylonitrile, etc. Latices may be prepared from copolymers of isoolefins such as isobutylene, and a minor amount of a diolefin such as butadiene, isoprene, pentadiene, etc.

Homopolymers such as polybutadiene, polyisoprene, etc. may also be extended with the oil extender composition of the present invention. The synthetic polymer may initially be prepared by emulsion polymerization, as indicated, in which case the polymer, as formed, will be in the form of a latex. However, the synthetic polymer may be prepared by any desired mass, solution, or suspension polymerization process followed by emulsification of the recovered rubbery polymer in order to provide a latex. This may likewise be the case with natural rubber.

The extender oil to be used should be a comparatively high molecular weight oil having a viscosity (SSU at 210° F.) within the range of about 40 to 200. Preferably, the boiling range will be within the range of about 700° to 1000° F. Representative examples of suitable extender oils include, for example, aromatic oils obtained by the solvent extraction of distillate fractions derived from naphthenic or paraffinic type crudes and containing from about 65 to 70 percent aromatics (silica gel analysis); more highly refined aromatic oils containing from about 75 to 85 volume percent of aromatics (silica gel analysis) obtained by the solvent extraction of catalytic cracking products; naphthenic oils containing from about 30 to 40 volume percent of aromatics (silica gel analysis) obtained by the hydrofining of a distillate fraction from a naphthenic type of crude; a paraffinc type oil obtained as a raffinate fraction from the solvent extraction of a paraffinic type crude oil, etc.

The first component of the emulsifier composition for the extender oil is a high molecular weight aliphatic hydrocarbon acid having a molecular weight within the range of about 200 to 2000 as exemplified by a crude heavy dibasic organic acid obtained as a by-product in the manufacture of sebacic acid from castor oil. A description of this product will be found, for example, in Cheetham et al., U.S. Patent No. 2,267,269. The product (a residue) is an amber colored viscous residue containing long-chain carboxylic acids (primarily dimeric fatty acids); such residue having an acid number between about 40 and 200, having an iodine number between 30 and 60, having an average molecular weight of about 1000, and being the nonvolatile material remaining from the vacuum distillation at 270° C. under 4 mm. pressure of the by-product acids obtained during the preparation of sebacic acid from castor oil. Other carboxylic fatty acids which may be utilized include $C_{12}$ to $C_{18}$ monocarboxylic fatty acids such as lauric acid, tridecoic acid, myristic acid, palmitic acid, marjaric acid, stearic acid, oleic acid, linoleic acid, linolenic acid, etc. and mixtures thereof; polycarboxylic acids such as brassylic acid, thapsic acid, etc. and mixtures thereof. The above fatty acids may be used in purified form if desired, or may be a component of a naturally occurring oil such as coconut oil, palm oil, talloil, oiticica oil, etc. and mixtures thereof. This component will constitute from about 50 to 95 volume percent of the emulsifier composition.

The other component of the emulsifier composition for the extender oil is a polyalkoxylated fatty acid containing from about 5 to 20 mols of combined alkylene oxide per mol equivalent of fatty acid (e.g., combined ethylene oxide or propylene oxide or a mixture thereof). The aliphatic monocarboxylic acid may be a $C_{12}$ to $C_{18}$ monocarboxylic acid, as set forth above, and may be used alone, in purified form, or in its impure form in a naturally occurring oil such as coconut oil, palm oil, talloil, oiticica oil, etc. This component will comprise the remaining 50 to 5 volume percent of the emulsifier composition.

The emulsifier composition for the extender oil is preferably prepared by blending the two components together in a suitable vessel and, preferably, at a temperature within the range of about 100° to about 200° F.

The thus prepared emulsifier composition is then blended with mild agitation (preferably at a temperature within the range of about 100° to about 200° F.) with a petroleum extender oil in an amount to provide an extender oil composition containing from about 90 to 98 volume percent of oil and from about 10 to 2 volume percent of the emulsifier composition. This material is then added to a rubber latex with gentle agitation (preferably at a temperature within the range of about 100° to 200° F.) in an amount sufficient to provide from 10 to 70 weight percent of extender oil based on the rubber content of the latex. The thus prepared extended latex may then be processed in various ways to yield oil-extended rubber products. For example, the intimately mixed aqueous emulsions of oil and rubber may be co-coagulated by use of a suitable coagulant such as sodium chloride and sulfuric acid.

The invention will be further illustrated by the following specific examples which are given by way of illustration and not as limitations on the scope of this invention.

Example I

An emulsifier composition for the extender oil was prepared by mixing together at 120° to 140° F. 90 weight percent of the crude heavy dibasic organic acid mixture identified above with 10 weight percent of a nonionic surfactant prepared by reacting talloil with 8 mols of ethylene oxide per mol of talloil.

The thus prepared emulsifier composition was added in a 4 percent by weight concentration to an aromatic extender oil having a gravity (° API) of 11.1, a viscosity (SSU at 210° F.) of about 85, a boiling range of about 750° to about 1000° F. and containing about 22 percent saturated (paraffinic and naphthenic) hydrocarbons, about 77 percent aromatic hydrocarbons and about 1 percent polar active compounds (silica gel analysis). The emulsifier composition was added to the oil without difficulty.

Thereafter, the extender oil containing the emulsifier composition was added with gentle agitation at a temperature of about 140° F. to a typical styrene-butadiene copolymer synthetic rubber latex in an amount sufficient to provide 50 parts of oil per 100 parts of polymer. This is an extreme test for compatibility. Incorporation was done with mild agitation at about 130° F. The oil was incorporated uniformly into the latex without difficulty.

Example II

Repeat Example I, but, in this instance, use the crude heavy dibasic organic acid as the sole emulsifier for the extender oil. Unsatisfactory results are obtained in that the oil does not incorporate into the latex during the extender oil-latex blending operation.

Example III

Repeat Example I utilizing, as the sole emulsifier for the extender oil, the ethylene oxide-talloil surfactant. Again, the results are unsatisfatcory in that the oil is not homogeneously incorporated into the latex. This is likewise the case when the oil is modified through the inclusion of a sulfonate type soap, an amine type soap, a rosin type soap or an oleate type soap.

Having thus described our invention, what is claimed is:

1. An oil composition for use in extending rubbery polymers consisting of from about 90 to 98 volume percent of a hydrocarbon extender oil having a viscosity (SSU at 210° F.) within the range of about 40 to 200 and, correspondingly, from about 10 to 2 volume percent of an emulsifier composition consisting of a mixture of about 50 to about 95 volume percent of an aliphatic hydrocarbon acid having a molecular weight within the range of 200 to 2000 and, correspondingly, about 50 to 5 volume percent of an alkylene oxide condensate of a fatty acid, said condensate having a molecular weight within the range of about 200 to 2000 and containing about 5 to 20 mols of alkylene oxide per mol equivalent of fatty acid.

2. A method conducted at a temperature within the range of 100° to 200° F. which comprises blending about 90 to 98 volume percent of extender oil having a viscosity (SSU at 210° F.) within the range of about 40 to 200 with about 10 to 2 volume percent of an emulsifier composition with agitation to provide an extender oil composition and thereafter blending said extender oil composition with an aqueous latex of a rubbery polymer in an amount sufficient to provide from about 10 to 70 weight percent of extender oil, based on the rubber content of the latex, said emulsifier composition consisting of a mixture of about 50 to about 95 volume percent of an aliphatic hydrocarbon acid having a molecular weight within the range of 200 to 2000 and, correspondingly, about 50 to 5 volume percent of an alkylene oxide condensate of a fatty acid, said condensate having a molecular weight within the range of 200 to 2000 and containing about 5 to 20 mols of alkylene oxide per mol equivalent of fatty acid.

3. An oil composition for use in extending rubbery polymers consisting of from about 90 to 98 volume percent of a hydrocarbon extender oil having a viscosity (SSU at 210° F.) within the range of about 40 to 200, correspondingly, from about 10 to 2 volume percent of an emulsifier composition consisting of a mixture of about 50 to about 95 volume percent of an aliphatic hydrocarbon acid having a molecular weight within the range of 200 to 2000 comprising long-chain dimeric carboxylic acids and being the nonvolatile material remaining from the vacuum distillation of the by-product acids obtained during the preparation of sebacic acid from castor oil and, correspondingly, about 50 to 5 volume percent of an alkylene oxide condensate of talloil prepared by reacting talloil with 8 mols of ethylene oxide per mol of talloil, said condensate having a molecular weight within the range of about 200 to 2000.

4. A method conducted at a temperature within the range of 100° to 200° F. which comprises blending about 90 to 98 volume percent of extender oil having a viscosity (SSU at 210° F.) within the range of about 40 to 200 with about 10 to 2 volume percent of an emulsifier composition with agitation to provide an extender oil composition and thereafter blending said extender oil composition with an aqueous latex of a synthetic rubber prepared by the emulsion copolymerization of styrene with butadiene in an amount sufficient to provide from about 10 to 70 weight percent of extender oil, based on the rubber content of the latex, said emulsifier composition consisting of a mixture of about 50 to about 95 volume percent of an aliphatic hydrocarbon acid having a molecular weight within the range of 200 to 2000 comprising long-chain dimeric carboxylic acids and being the non-volatile material remaining from the vacuum distillation of the by-product acids obtained during the preparation of sebacic acid from castor oil and, correspondingly, about 50 to 5 volume percent of an alkylene oxide condensate of talloil prepared by reacting talloil with 8 mols of ethylene oxide per mol of talloil, said condensate having a molecular weight within the range of 200 to 2000.

References Cited in the file of this patent

UNITED STATES PATENTS

| | | |
|---|---|---|
| 2,267,269 | Cheetham et al. | Dec. 23, 1941 |
| 2,559,583 | Barker | July 10, 1951 |
| 2,899,401 | Eby | Aug. 11, 1959 |
| 2,914,477 | Cafcas | Nov. 24, 1959 |
| 2,915,489 | White | Dec. 1, 1959 |
| 2,964,083 | Pfau et al. | Dec. 13, 1960 |

FOREIGN PATENTS

| | | |
|---|---|---|
| 794,837 | Great Britain | May 14, 1958 |